US012572533B1

(12) United States Patent
Arkhangelskiy et al.

(10) Patent No.: US 12,572,533 B1
(45) Date of Patent: Mar. 10, 2026

(54) SEQUENCE GENERATION IN A DISTRIBUTED DATABASE

(71) Applicant: Amazon Technologies, Inc., Seattle, WA (US)

(72) Inventors: Dmitry Arkhangelskiy, London (GB); James Laurence Finnerty, Sarasota, FL (US); Radwan Deeb, Leimen (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/622,523

(22) Filed: Mar. 29, 2024

(51) Int. Cl.
| | |
|---|---|
| *G06F 16/00* | (2019.01) |
| *G06F 16/242* | (2019.01) |
| *G06F 16/2453* | (2019.01) |
| *G06F 16/27* | (2019.01) |

(52) U.S. Cl.
CPC .... *G06F 16/2433* (2019.01); *G06F 16/24542* (2019.01); *G06F 16/27* (2019.01)

(58) Field of Classification Search
CPC . G06F 16/2433; G06F 16/24542; G06F 16/27
See application file for complete search history.

(56) References Cited

U.S. PATENT DOCUMENTS

| | | | | |
|---|---|---|---|---|
| 10,769,148 | B1 * | 9/2020 | Binkert | G06F 16/24542 |
| 11,416,806 | B1 * | 8/2022 | Aggarwal | G06F 12/0811 |
| 11,526,927 | B1 * | 12/2022 | Aggarwal | G06F 12/0811 |
| 11,874,691 | B1 * | 1/2024 | Batsakis | G06F 16/2282 |
| 12,210,524 | B1 * | 1/2025 | Siragusa | G06F 16/2393 |
| 2018/0268030 | A1 * | 9/2018 | Liu | G06F 16/2471 |
| 2019/0163773 | A1 * | 5/2019 | Sun | G06F 16/2282 |
| 2024/0004890 | A1 * | 1/2024 | Kim | H04L 67/63 |
| 2024/0004897 | A1 * | 1/2024 | Pandis | G06F 16/25 |
| 2025/0036622 | A1 * | 1/2025 | Dhuse | G06F 16/24568 |

* cited by examiner

*Primary Examiner* — Alexander Khong
(74) *Attorney, Agent, or Firm* — Davis Wright Tremaine LLP

(57) ABSTRACT

A distributed database receive a request to provide a sequence of unique values to one or more nodes of the distributed database. The distributed database stores an indication of a first range of the sequence of unique numbers on a first node of the distributed database, and provides a value within the first range in response to a query. The distributed database is caused to process the query using the value within the first range.

20 Claims, 8 Drawing Sheets

300

| parse query | 302 |
| identify sequence expression query | 304 |
| generate sequence value per sequence expression | 306 |
| replace sequence expression with generated sequence value | 308 |
| route modified query to shard node(s) | 310 |
| provide query results | 312 |
| obtain new range if needed | 314 |

200

| parse CREATE SEQUENCE command | 202 |

| store record of sequence state on default node | 204 |

| store record of reserved sequence portion on router node | 206 |

| router node provides sequence values | 208 | local range exhaused? — 210

—no— yes

| reserve new range of sequence for router node | 212 |

| update record of sequence state on default node | 214 |

300

| parse query | 302 |

| identify sequence expression query | 304 |

| generate sequence value per sequence expression | 306 |

| replace sequence expression with generated sequence value | 308 |

| route modified query to shard node(s) | 310 |

| provide query results | 312 |

| obtain new range if needed | 314 |

400 assigned range [20000; 39999].

node
(router)
406 node
(router)
408 assigned range [0; 19999].

node
(default)
410 assigned range [40000; 59999].

global:
values: [0; 100000]
last: 39999 global:
values: [0; 100000]
last: 59999

412

600

| router node starts | 602 |

| router node obtains sequence state from default node | 604 |

| router node reserves range of sequence | 606 |

| router node generates sequence values in reserved range | 608 |

700

SEQUENCE GENERATION IN A DISTRIBUTED DATABASE

BACKGROUND

Database management systems often use sequences of unique values to use for various purposes. For example, unique values may serve as identifiers for rows to be inserted into a database table. Because each identifier is unique, the corresponding row in the database can be efficiently stored or retrieved from the database management system using the identifier. However, in a distributed database management system, it is difficult to efficiently generate such sequences.

BRIEF DESCRIPTION OF THE DRAWINGS

Various techniques will be described with reference to the drawings, in which.

DETAILED DESCRIPTION

Figure 1:
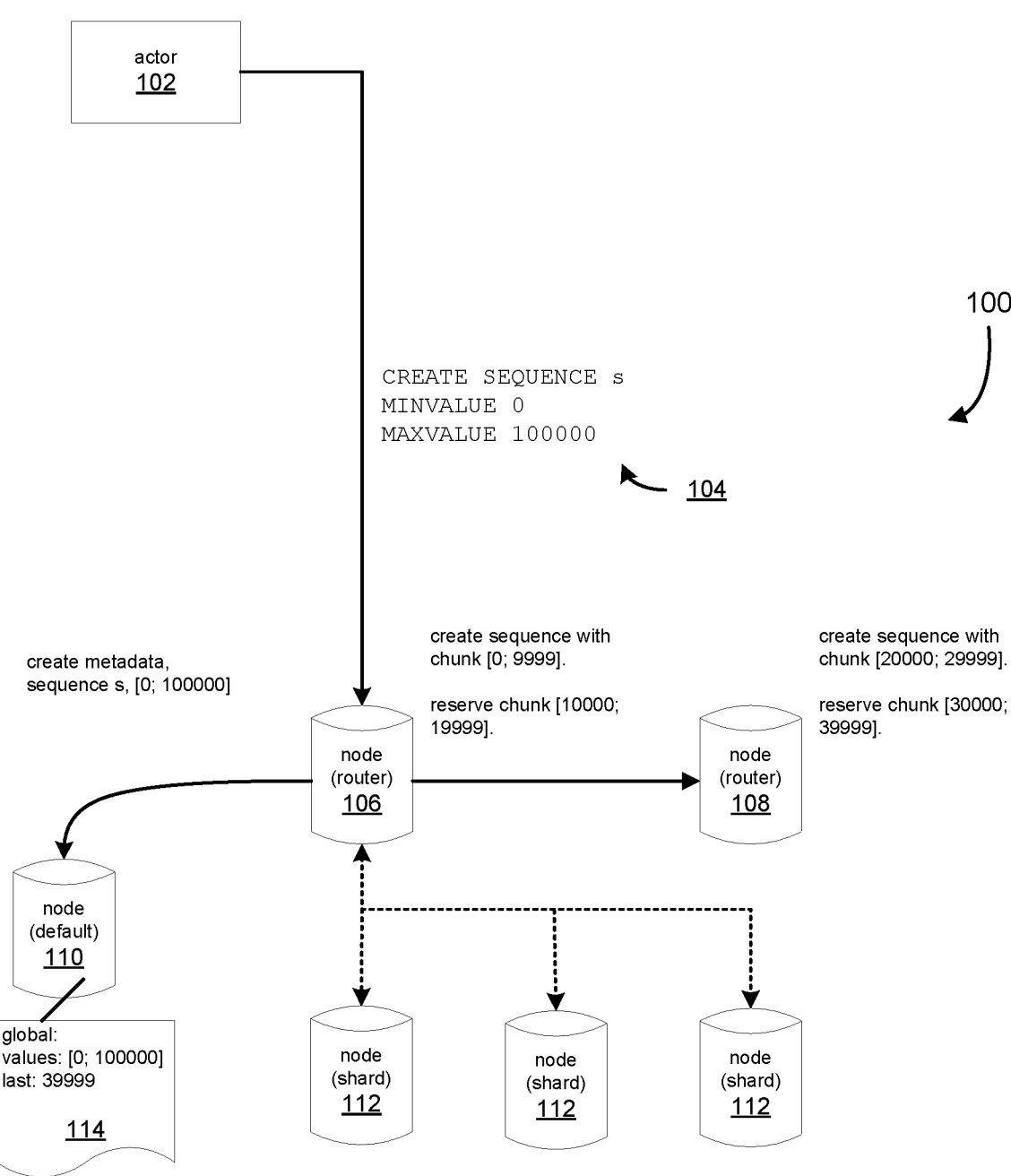
FIG. 1 illustrates a distributed database system with distributed sequence generation, in accordance with at least one embodiment.

In an example embodiment, a distributed database system comprises a default node, one or more router nodes, and one or more additional nodes, sometimes referred to as shards, that maintain portions of a collection of data. To process queries that rely on unique values, sometimes referred to as identifiers, the example distributed database system provides facilities that enable an entity using the distributed database management system to define a sequence of values, and to subsequently cause values in the sequence to be generated. For example, a user might submit a command to the database management system that defines a sequence of numbers from zero to 1,000,000 with increments of one. The user may subsequently submit a query to the database management system that includes a reference to a function that generates the next value in the sequence. This function might, for example, return zero the first time it is used, then one, and so on. In an example of using this feature, a query to insert a row into a database table may use the function to generate a unique identifier for that row.

In the example embodiment, generation of these values is performed in distributed fashion among nodes of the distributed database management system. In particular, in the example embodiment the default node maintains a record of the global state of the sequence, and the router nodes each generate sequence values within a range of the sequence assigned to them. The example embodiment may generate such sequences by monotonically increasing its generated values, so that each generated value is larger than any values previously generated by that router node.

In the example embodiment, when a command defining a sequence is provided to the distributed database system, it is initially processed by a router node that first identifies the parameters of the sequence, such as its minimum and maximum values. Then, using these values, the router node causes a range of values within the sequence to be assigned to it, and causes information describing the global state of the sequence to be stored on the default node. The global state information may include information indicating the highest value of any range of the sequence assigned to a router node, thereby indicating the unassigned portions of the range. The router node may also cause other router nodes to be assigned a non-overlapping range of the sequence.

In the example embodiment, the router node processes queries that include references to functions to generate a value from the sequence. To process these queries, the router node generates the next unused value within the range of the sequence assigned to that router node. The value may be generated based on a monotonic increase over a previously generated value. When values within the current range are exhausted, the router node obtains a new range of the sequence. Other router nodes process such queries similarly, within the range of the sequence that is respectively assigned to them. After a router node generates a sequence number, the router node of the example embodiment modifies the query to include the generated sequence number in place of the reference to the function. The router node then forwards the modified query to one or more shard nodes to generate the results of the query, and provides those results to the requesting entity.

The use of these techniques convey to the example embodiment advantages which can include the ability to provide sequence generation capabilities in a scalable manner. For example, the example embodiment permits additional routers to be added to the system and to process queries that reference a defined sequence. Similarly, router nodes in the example embodiment may be able to recover from downtime caused by maintenance or failure and to provide sequence numbers for ranges that were defined prior to or during this downtime.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a distributed database system 100 with distributed sequence generation, in accordance with at least one embodiment. A distributed database system, such as the distributed database system 100 depicted by FIG. 1, is a system that uses multiple computing devices to store and retrieve data. Examples include, but are not limited to, relational database systems such as Oracle, DB2, Postgres, or PostreSQL, and non-relational or NoSQL databases such as Cassandra or BigTable.

In an embodiment, a distributed database system 100 comprises nodes 106-112. The nodes 106-112 may each comprise software and hardware to operate an instance of a database program. Certain of the nodes 106-112 may perform additional roles in relation to the distributed database system 100. For example, as illustrated in FIG. 1, a node 110 may be assigned the role of being a default node of the distributed database system 100, nodes 106-108 may be assigned the role of routers, and nodes 112 may be assigned to operate as shards hosting one or more partitions of the collection of data maintained by the distributed database system 100.

A node of a distributed database system, such as any of nodes 106-112, comprises one or more processors, memory to store instructions to operate an instance of a database program, and in at least some cases storage used to store data from the collection of data maintained by the distributed database system. A database program refers to software comprising instructions that, when performed by one or more processors of a node, causes the node to perform operations related to one or more features of the distributed database system 100. For example, embodiments of a database program may include code to parse commands or queries such as those that might be contained in a structured query language ("SQL") statement, code to generate a plan for performing a query expressed in such a statement, and code to perform the generated plan. A node of a distributed database may sometimes be referred to as a shard. As used herein, a query comprises text, binary data, or other data that conveys instructions for performing an operation on a database. For example, a query can include a SQL statement that inserts, updates, deletes, or modifies data maintained by the database management system. A query can also include data definition language ("DDL") commands, such as commands to define a unique sequence of values.

A default node 110 may act as a primary repository of global state information for distributed database system 100. A router node, such as either of router nodes 106, 108, may perform operations to direct the performance of certain operations of the distributed database system 100, such as the processing of commands and queries that are issued by an actor 102. The actor 102 can correspond to any of a variety of sources for such commands and queries, such as a computing device running an application that relies on data to be stored in or obtained from the distributed database system 100. Nodes not assigned to be either a default node or router node, such as nodes 112, may be referred to as nodes or shards. These nodes, in embodiments, store collections of data, such as partitions and/or replicas, of data maintained by the distributed database system 100.

An actor 102 may issue a command to request that a sequence of values be generated in relation to the operation of the distributed database system 100. For example, in cases and embodiments, the actor 102 may issue a SQL command that defines a sequence of values that will be subsequently used for a series of queries that, when processed, will generate and use values within the sequence. For example, the actor 102 may issue a command 104 of CREATE SEQUENCE s MINVALUE 0 MAXVALUE 100000 to define a sequence of values, named s, that starts with zero and ends with 100,000. A subsequent command, such as a command to insert a record into the collection of data maintained by the distributed database system 100, may request the next value in the sequence with an expression such INSERT rec INTO t1 VALUES (nextval( ), "entry"). This causes the next value in the sequence to be generated and used, in this example, to insert a new record into the table t1.

In embodiments, a property of the sequence is that a value of the sequence, once generated, is unique with respect to the defined sequence. For example, for a given sequence a command that generates a sequence value, such as nextval referred to above, will never return any given value in the sequence more than once. Although different patterns may be used, the value may typically be incremented by some amount each time, to generate a sequence such as 1, 2, and 3 in response to three successive uses of nextval. In cases and embodiments, this uniqueness of values in a sequence is scoped per session, per user, per table, or per distributed database.

In an embodiment, command 104 is received by a router node 106, which parses the command and determines that it comprises instructions to create a sequence. In the example of FIG. 1, the sequence is a numeric sequence starting from zero and ending in 100,000. It will be appreciated that this example is not intended to be limiting. In embodiments, other patterns may be defined, such as those that decrement instead of increment, use different intervals, or that contain alphabetic or alphanumeric characters.

The router node 106, upon determining that the command 104 includes instructions to create a sequence and determining the parameters of the sequence, may determine a division of the sequence that it is to handle. In the example of FIG. 1, for example, the router node 106 is assigned to handle values of the sequence between 0 and 19,999.

The router node 106 may also cause a record 114 of the sequence to be stored as global data on default node 110. This record 114 may comprise information identifying the generated sequence, including its minimum and maximum values. It may also include related information such as a name of the sequence, how values in the sequence increment or decrement, and so forth. The record 114 may also comprise information indicating which ranges, or chunks, within the sequence have been assigned and/or which ranges are used. In the example of FIG. 1, this information is conveyed by the record 114 having a record of the last value in the sequence that was assigned a router node.

Other router nodes, such as router node 108, may be assigned to process other portions of the sequence. In the example of FIG. 1, router node 108 is assigned to process portions of the sequence from 20,000 to 39,999 and, as illustrated by the contents of the record 114, the last assigned value in the sequence is 39,999.

In at least one embodiment, ranges of values are assigned to nodes by the nodes themselves. For example, either of router nodes 106, 108 may determine that it either has no values assigned to it in the range, or that it has already provided all values within the range it is assigned, and initiate the assignment in response to that determination. In at least one embodiment, performing the assignment comprises communicating with the default node 110 to indicate that its record of assigned portions of the range be updated.

In at least one embodiment, a router nodes 106 or 108 may use facilities of its local database instance to generate a local sequence. For example, an instance of a database operating on router node 106 might process a CREATE SEQUENCE local MINVALUE 0 MAXVALUE 9,999 that is usable, within the local database instance, to create and generate sequence values from the range zero to 9,999. The same database instance might subsequently modify this sequence, or create a new sequence, to generate numbers within some other portion of its assigned range, such as from 10,000 to 19,999. Similar operations might be performed by other router nodes, such as the depicted router node 108.

Actor 102 may send a query (not depicted in FIG. 1) to the distributed database system 100. The query is received by a router node of the distributed database system 100, such as router node 106. The router node 106 parses the query and determines that it contains an expression that uses the generated sequence. As noted above, a non-limiting example of such a query is INSERT rec INTO t1 VALUES (nextval( ), "entry"), which requests the generation of the next value in a defined and applicable sequence, such as the sequence from 0 to 100,000 defined in the example of FIG. 1.

In at least one embodiment, the router node 106 responds to the receipt of this query by parsing the query and determining that it has within it an expression, such as nextval, that calls for the generation of a sequence number. The router node 106 may then generate the next value in the sequence and update its local records of its usage of the sequence. The router node 106 may also modify the query so that it includes a constant value corresponding to the generated value of the sequence. Continuing the prior example, the router node 106 might modify the query to be "INSERT rec INTO t1 VALUES (36, "entry"), presuming that the number 36 was the appropriate next value in the sequence. The router node 106 might then determine which of the shard nodes 112 should be involved in processing the updated and modified query. After one or more of the shard nodes 112 processes its portion of the query, the router node 106 may assemble and/or forward the query's results to the actor 102.

In at least one embodiment, the router node 106 may process any of a variety of sequence related commands or functions. These may include commands to define or create a sequence, to generate the next value in a sequence, to list currently defined sequences, to obtain one or more recently generated sequence values, and so forth. The router node may, in some cases, provide support for these commands by using a local database instance on which the sequence has been defined over the range assigned to the router node 106.

In an example embodiment, one or more components of the distributed database system 100 of FIG. 1 perform a computer-implemented method, comprising receiving a request to provide a sequence of unique values that may be used by nodes of a distributed database to process one or more database queries, and storing an indication of an assigned range of the sequence of unique values on a router node of the distributed database. The computer-implemented method may further comprise causing the router node to provide, in response to a database query, a value generated to be within the range of the sequence of unique values assigned to the router node, and causing the distributed database to process the query using the generated value.

In a further embodiment of the computer-implemented method, an indication of minimum and maximum values of the sequence of unique values, and an indication of one or more unassigned ranges of the sequence of unique values, are stored on a designated default node of the distributed database. A node is designated as a designated default node when it is assigned, at least, the role of maintaining a global state of a defined sequence.

A further embodiment of the computer-implemented method comprises assigning the router node an additional range of the sequence of unique values in response to determining that the router node has exhausted unique values within the currently assigned range.

A further embodiment of the computer-implemented method comprises generating the value within the assigned range in response to one or more expressions in the database query that are indicative of generating a value in the sequence, and modifying the database query to include the generated value. Examples of such an expression include, but are not limited to, the use of a function such as nextval that indicates that a new value of the sequence should be generated.

In a further embodiment of the computer-implemented method, the sequence of unique values is divided into a plurality of ranges comprising a first range and a second range. The first range is assigned to a first router node, and the second range is assigned to a second router node. Each of the router nodes responds to a database query containing a function such as nextval by providing one or more sequence numbers within the corresponding range.

In another example, an embodiment of a system, such as the distributed database system 100 depicted in FIG. 1, comprises one or more processors and one or more memories that store computer-executable instructions that, when executed by the one or more processors, cause the system to at least receive a request to provide a sequence of unique values to one or more nodes of a distributed database, and store an indication of a first range of the sequence of unique numbers on a first node of the distributed database. The instructions, when executed by the one or more processors, may further cause the system to at least provide, by the first node of the distributed database and in response to a query, a value within the first range; and cause the distributed database to process the query using the value within the first range.

In a further embodiment of this example system, the memories also store computer-executable instructions that, when executed by the one or more processors, cause the system to at least cause an indication of minimum and maximum values of the sequence of unique values to be stored on another node of the distributed database, and cause an indication of one or more unassigned ranges of the sequence of unique values to be stored on the another node.

In a further embodiment of this example system, the first node is assigned an additional range of the sequence of unique value based, at least in part, on use of available numbers in the first range being above a threshold amount.

In a further embodiment of this example system, the memories also store computer-executable instructions that, when executed by the one or more processors, cause the system to at least generate the value within the first range in response to identifying an expression in the database query that is indicative of generating a value in the sequence, and modify the database query to include the generated value.

In a further embodiment of this example system the sequence of unique values is divided into a plurality of ranges comprising the first range and a second range, and wherein a second node of the distributed database is to provide, in response to the query, one or more values within the second range.

In a further embodiment of this example system, the first node routes one or more portions of the query to one or more other nodes of the distributed database.

In a further embodiment of this example system, a node of the distributed database is assigned a range of the sequence of unique numbers upon being added to the distributed database.

In a further embodiment of this example system, the memories store computer-executable instructions that, when executed by the one or more processors, cause the system to at least generate the value using a local instance of a database.

In a further embodiment of this example system, the memories store computer executable instructions that, when executed by the one or more processors, causes the system to at least generate the value in the first range without using information obtained from a computing device external to the first node. For example, a first node of the example system may generate a unique value in the sequence by referencing a locally stored value indicating what value was most recently generated by that node, and incrementing it. Because the node has been assigned a distinct range from the sequence of values, a value generated in this way is guaranteed to be unique over the entire sequence.

Figure 2:
FIG. 2 illustrates a process for initializing and using a sequence in a distributed database, in accordance with at least one embodiment.
Figure 2:
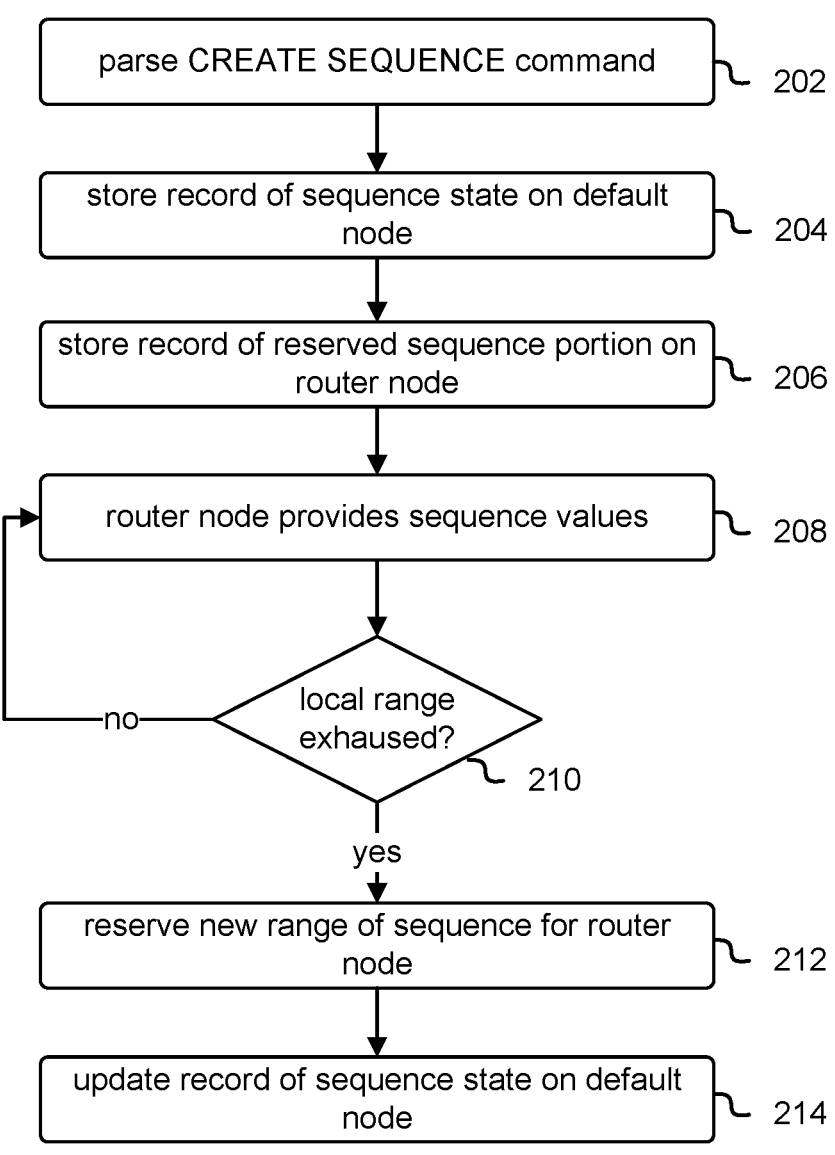

FIG. 2 illustrates a process for initializing and using a sequence in a distributed database, in accordance with at least one embodiment. The example process 200 that is illustrated by FIG. 2 may be implemented by one or more components of FIG. 1, potentially including but not limited to one or more of the default node 110, router nodes 106, 108, or shard nodes 112. In at least one embodiment, the example process 200 is implemented by any suitable combination of hardware and software, such as by a system comprising at least one processor and one or more memories that have stored thereon instructions that, when performed by the at least one processor, cause the system to perform the operations of process 200. It will be appreciated that, although FIG. 2 is depicted as a series of sequential elements, the operations described in relation to FIG. 2 may be performed in an order other than what is depicted, and that certain operations may, in at least some embodiments, be omitted or performed in a different order than what is depicted. For example, some of the operations might be performed in a different order or in parallel, except where explicitly indicated or logically required, such as when the input of a depicted operation depends upon the output of another depicted operation.

In the example process 200, a router node of a distributed database system, such as the router node 106 of the distributed database system 100 of FIG. 1, receives an input from an entity, such as the actor 102 depicted in FIG. 1, where this entity input comprises a CREATE SEQUENCE command. In the example process 200, at 202, the node of the distributed database system parses the input and identifies the command as indicating that a sequence should be defined.

In the example process 200, at 204, a record of the sequence's state is stored on the default node. In at least one embodiment, the router node causes the record to be stored on the default node, using parameters of the sequence identified by parsing. In at least one embodiment, the record comprises an indication of minimum and maximum ranges of the sequence, and an indication of which ranges have been assigned to a router node.

In the example process 200, at 206, a record of an assigned sequence portions is stored on the router node. In at least one embodiment, a router node determines that a sequence has been or is to be generated, determines how the range has been or is to be divided among it and other router nodes, identifies a range that has not yet been assigned to a router node, and claims an unassigned range. In at least one embodiment, the range is claimed by causing the record of the sequence's state, at the default node, to be updated. As depicted in relation to FIG. 1, this update can include updating the record of the sequences global state to indicate the maximum value of a range that has been assigned to a router node.

In the example process 200, element 208 may be performed when a router node of the distributed database receives a query that includes a sequence expression indicating that a sequence number should be generated, such as a query that comprises a nextval function as described in relation to FIG. 1. At 208, the router provides a sequence value. In at least one embodiment, this is done by causing the next value in the sequence to be generated using a local sequence generator. The local sequence generator may comprise software whose instructions, when performed by a processor of the router node, cause the router node to generate the next value of the sequence within the range assigned to the router node.

In the example process 200, at 210, the router node determines whether the local range of the sequence has been exhausted. For example, the router node may generate the next number of the sequence within it's assigned range and then determine that the next value in the sequence would exceed the maximum value of the router node's assigned range. If so, operations described in relation to process elements 212 and 214 may be performed. Otherwise, if the next value in the sequence will fall within the range assigned to the router node, operations described in relation to process element 208 may be repeated.

In the example process 200, at 212, a new range of the sequence is reserved for the router node. In at least one embodiment, the router node does this by communicating with the default node to identify a currently unassigned range and assign that range to the router node. In at least one embodiment, this is done in conjunction with updating the record of the sequence's state on the default node, at 214, to indicate that the router node has reserved a new range. For example, in at least one embodiment, the maximum value reserved by any router node is stored as a component of the record of the sequence's state on the default node, and this value is increased to indicate that the router node has claimed an additional range of the sequence. This approach is illustrated by FIG. 1. In some cases, the operations described in relation to elements 212 and 214 are performed as an atomic operation.

Figure 3:
FIG. 3 illustrates a process for handling queries comprising sequence expressions, in accordance with at least one embodiment.
Figure 3:
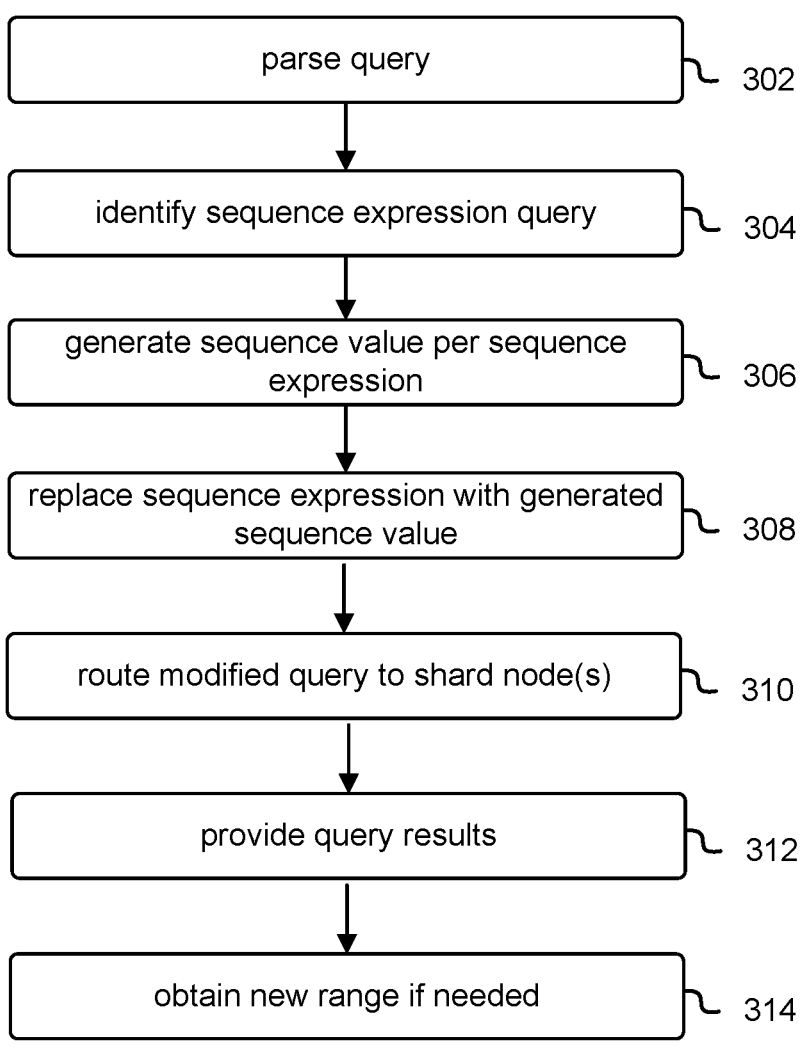

FIG. 3 illustrates a process for handling queries comprising sequence expressions, in accordance with at least one embodiment. The example process 300 that is illustrated by FIG. 3 may be implemented by one or more components of FIG. 1, potentially including but not limited to one or more of the router nodes 106, 108 and/or shard nodes 112 that are depicted in that figure. In at least one embodiment, the example process 300 is implemented by any suitable combination of hardware and software, such as by a system comprising at least one processor and one or more memories that have stored thereon instructions that, when performed by the at least one processor, cause the system to perform the operations of process 300. It will be appreciated that, although FIG. 3 is depicted as a series of sequential elements, the operations described in relation to FIG. 3 may be performed in an order other than what is depicted, and that certain operations may, in at least some embodiments, be omitted or performed in a different order than what is depicted. For example, some of the operations might be performed in a different order or in parallel, except where explicitly indicated or logically required, such as when the input of a depicted operation depends upon the output of another depicted operation.

In the example process 300, at 302, a router node parses a query. The query may be included in a SQL statement or similar data sent by an entity to the distributed database. At 304, the router node identifies a sequence expression in the query. A sequence expression comprises a reference to or an indication of a sequence that was previously defined, for example by the submission by the entity of a CREATE SEQUENCE command as described in relation to FIG. 1. The sequence expression may refer to or indicate the sequence by the use of a function, such as nextval, that indicates that the next value in the sequence should be generated.

In the example process 300, at 306, the router node generates the sequence value per the sequence expression. This may comprise, for example, accessing the most recently generated value in the sequence, incrementing the value, and storing an updated record locally to indicate the newly generated value.

In the example process 300, at 308, the router node replaces the sequence expression with the generated sequence value. In at least one embodiment, this is done by substituting text in the query that references the sequence expression with text that indicates the generated sequence value. In other cases and embodiments, this may comprise parameterizing the query and indicating values of the sequence via those parameters.

In the example process 300, at 310, the modified query is routed to one or more shard nodes. In at least one embodiment, the router node generates a plan of performing the query. To generate the plan, the router node may parse the query, identify data ranges applicable to the query, and determine which shards of the distributed database comprise data within those ranges. The router database may then forward some or all of the query to those nodes. In some cases, the query may either not reference data on a different node or not reference data, in which case the router node may process the query locally. After the query plan is performed and data is returned from all of the involved shards, the results may be combined and provided to the requesting entity, at 312.

In the example process 300, at 314, the router node determines if a new range needs to be assigned. In at least one embodiment, this is performed by a background process that determines that the current range is at or near exhaustion, and if so, initiates communication with the default node to secure a new range. The obtaining of a new range may be done at different times in different embodiments. For example, an embodiment of distributed database system 100 might proactively obtain an additional range based on an estimate of when the current range is likely to be fully exhausted.

Figure 4:
FIG. 4 illustrates assignment of a range of a sequence to a router node, in accordance with at least one embodiment.
Figure 4:
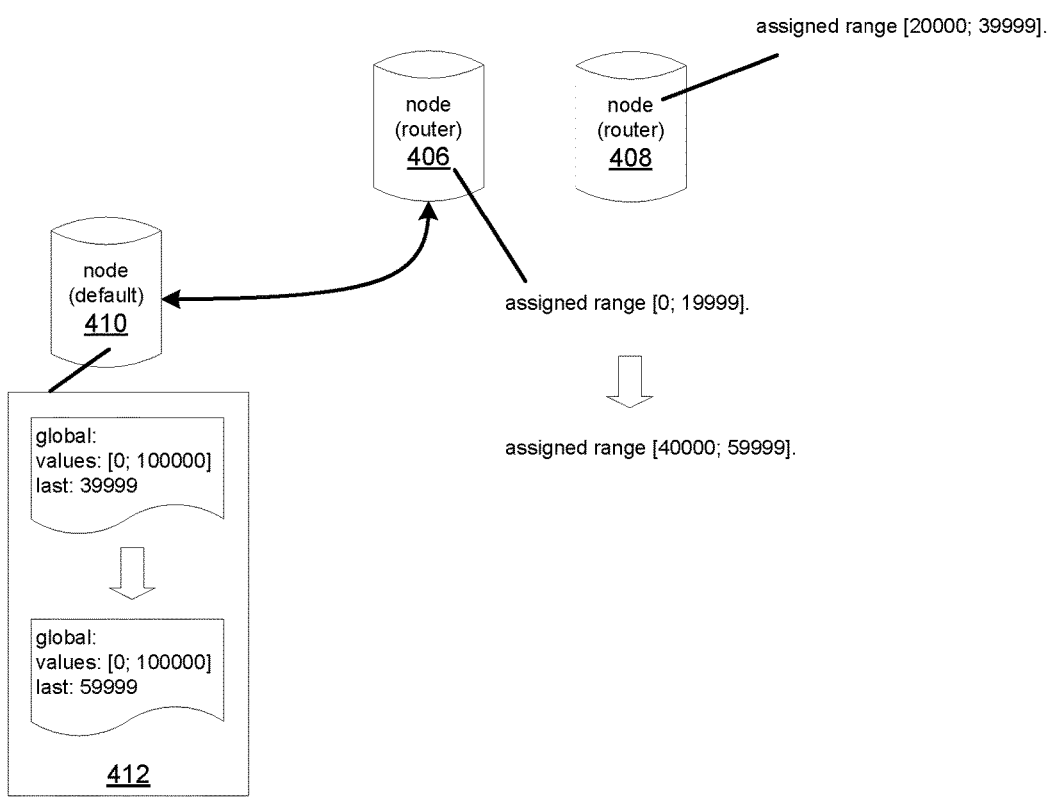

FIG. 4 illustrates assignment of a range of a sequence to a router node, in accordance with at least one embodiment. In the example of FIG. 4, a distributed database system 400 comprises a default node 410 and router nodes 406, 408. These may correspond, respectively, to distributed database system 100, default node 110 and router nodes 106, 108 of FIG. 1. Corresponding to the example provided with respect to FIG. 1, the distributed database system 400 may have, in response to a request from actor 102, defined a sequence from zero to 100,000 and initially assigned the range of 0-19999 to the first router node 406 and 20,000-39,999 to the second router node 408.

As described in relation to FIGS. 2-3, a router node may exhaust its current assigned range by generating a sufficient number of values from within the sequence. Exhausting may refer to a number of remaining values being below some threshold amount, where this amount may be determined, in at least one embodiment, according to an expected length of time required to obtain a new assigned range.

In at least one embodiment, a background process on router node 406 determines that its current range of the sequence is exhausted, and initiate a process to assign an additional range to the router node 406. This may be done by communicating with the default node 410 and causing it to update its record of assigned ranges. As depicted in FIG. 4, this may comprise updating a record of the last assigned value to a new value reflecting a new range assignment. In FIG. 4, this is shown as the last value of the record 412 being updated from 39,999 to 59,999, to reflect an assignment of the range 40,000-59,999. The router node 406 may, for example, cause the default node to update it's record of the last assigned value by causing the default node to process a database command, with sufficient safeguards to prevent another node from making a conflicting update.

After obtaining the new range assignment, the router node 406 may begin generating sequence numbers within that assigned range. In at least one embodiment, this is done by creating a local sequence generator, using facilities of the local database instance, to generate numbers within the newly assigned range. If a previous instance of the local sequence generator exists, it may be replaced by the new instance.

Figure 5:
FIG. 5 illustrates scaling nodes to generate sequence values in a distributed database, in accordance with at least one embodiment.
Figure 5:
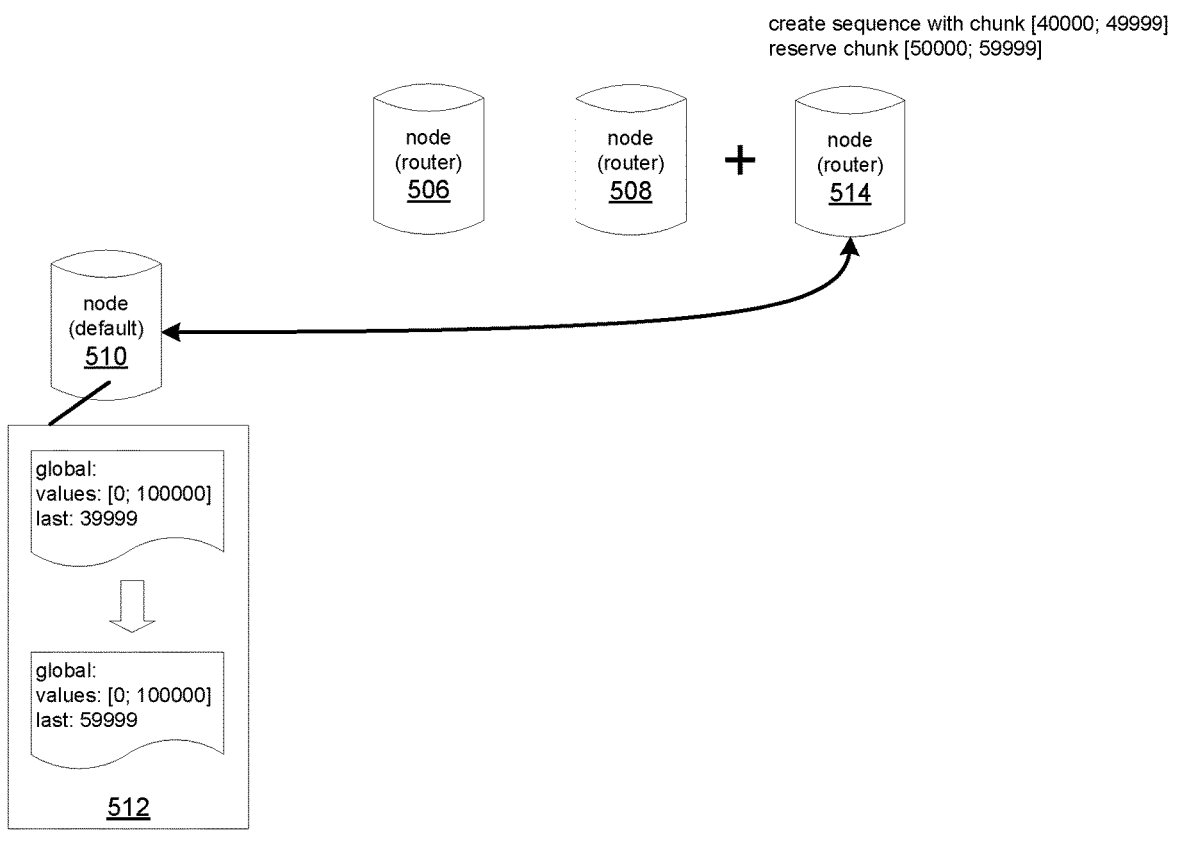

FIG. 5 illustrates scaling nodes to generate sequence values in a distributed database, in accordance with at least one embodiment. In the example of FIG. 5, a distributed database system 500 comprises a default node 510 and router nodes 506, 508. These may correspond, respectively, to distributed database system 100, default node 110 and router nodes 106, 108 of FIG. 1. Corresponding to the example provided with respect to FIG. 1, the distributed database system 500 may have, in response to a request from actor 102, defined a sequence from zero to 100,000 and initially assigned the range of 0-19999 to the first router node 506 and 20,000-39,999 to the second router node 508.

The number of router nodes in a distributed database system, such as distributed database system 500, may be scaled upwards or downwards to account for changes in computational workload. In the example of FIG. 5, it is assumed for illustrative purposes that demand has increased and a new router node 514 is to be added to the distributed database system. In this case, the new router node 514 may obtain a range of the defined sequence, by communicating with the default node 510 and causing it to update its record of assigned ranges. As depicted in FIG. 5, this may comprise updating a record of the last assigned value to a new value reflecting a new range assignment. In FIG. 5, this is shown as the last value of the record 512 being updated from 39,999 to 59,999, to reflect an assignment of the range 40,000-59, 999. The router node 506 may, for example, cause the default node to update it's record of the last assigned value by causing the default node to process a database command, with sufficient safeguards to prevent another node from making a conflicting update. The router node 506 may then generate values in the range now assigned to it.

Figure 6:
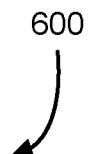
FIG. 6 illustrates recovery of a node to generate sequence values in a distributed database, in accordance with at least one embodiment.
Figure 6:
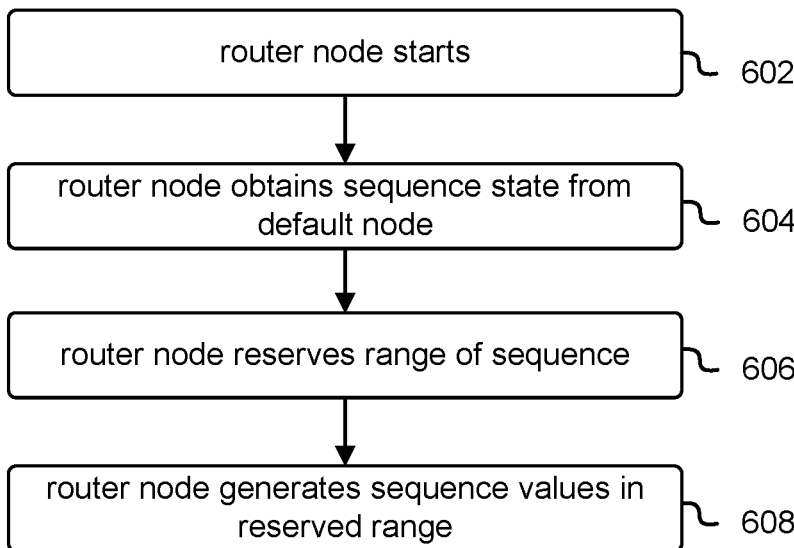

FIG. 6 illustrates recovery of a node to generate sequence values in a distributed database, in accordance with at least one embodiment. The example process 600 that is illustrated by FIG. 6 may be implemented by one or more components of FIG. 1, potentially including but not limited to one or more of the router nodes 106, 108 that are depicted in that figure. In at least one embodiment, the example process 600 is implemented by any suitable combination of hardware and software, such as by a system comprising at least one processor and one or more memories that have stored thereon instructions that, when performed by the at least one processor, cause the system to perform the operations of process 600. It will be appreciated that, although FIG. 6 is depicted as a series of sequential elements, the operations described in relation to FIG. 6 may be performed in an order other than what is depicted, and that certain operations may, in at least some embodiments, be omitted or performed in a different order than what is depicted. For example, some of the operations might be performed in a different order or in parallel, except where explicitly indicated or logically required, such as when the input of a depicted operation depends upon the output of another depicted operation.

In the example process 600, at 602, a router node starts. This can, for example, include a router node starting upon being added to a system, similar to what is described in relation to FIG. 5.

In the example process 600, at 604, the router node obtains a sequence state from a default node, such as from the default node 110 of FIG. 1. From this state the router node may determine that one or more sequences have been defined and that the router node does not have a range from the sequence assigned to it. In some embodiments, the router node may determine this in other ways, such as by receiving a query that includes a reference to a sequence. Consequently, in these embodiments, the router node may avoid this step of communicating with the default node.

In the example process 600, at 606, the router node reserves a range of sequence values. As described herein in relation to the various figures, this may be performed by the router node causing the default node to update its record of assigned ranges. In at least one embodiment, for example, the router node causes the default node to increment its record of the last assigned value by an amount equal to a range increment.

In the example process 600, at 608, the router node generate sequence values in the reserved range. As described herein, for example with respect to FIG. 3, this may be performed in relation to processing queries, using techniques described in relation to that figure.

Figure 7:
FIG. 7 illustrates a node of a distributed database with distributed sequence generation capabilities, in accordance with at least one embodiment.
Figure 7:
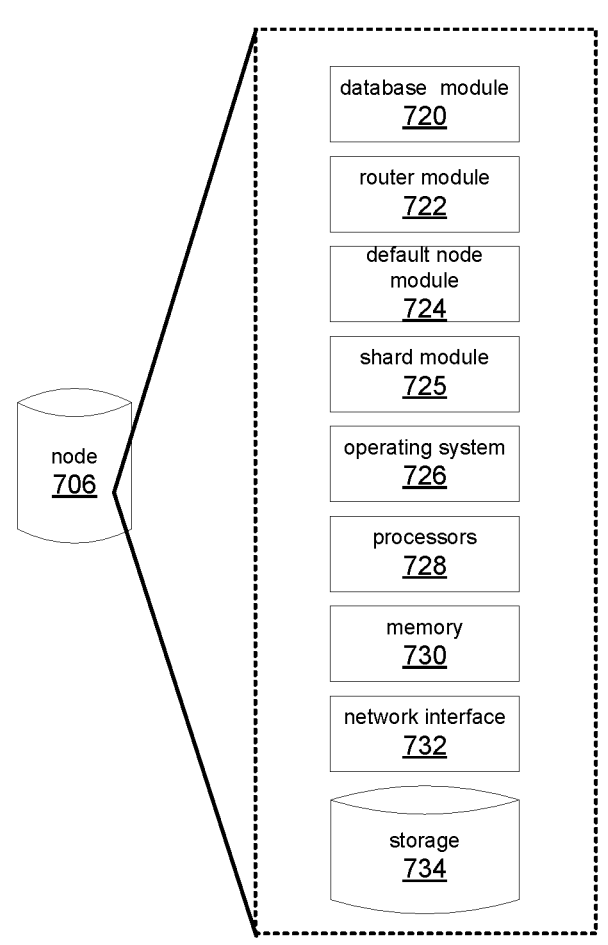

FIG. 7 illustrates a node of a distributed database 700 with distributed sequence generation capabilities, in accordance with at least one embodiment. The depicted node 706 may correspond to any of the default node 110, router nodes 106, 108, or shard nodes 112 that are depicted in FIG. 1. The node 706 may comprise processors 728, memory 730, a network interface 732, and storage 734. The processors 728 include any computer processors suitable to perform the operations of a node of the distributed database. The memory 730 may be any suitable non-transitory memory to store instructions that, when performed by one or more of the processors 728, cause the node 706 to perform an operation described herein in relation to a node of a distributed database. The network interface 732 may be any network interface suitable to use to communicate with other nodes of the distributed database, and in the case of router nodes suitable for communication with an entity that uses the distributed database system. The node 706 may further contain an operating system 726 to control input and output and other basic operations.

The node 708 may further comprise one or more modules to perform various operations described herein. A module, as used here, may refer to computer software that, when loaded into processor-accessible memory and performed by a processor, causes the node to perform one or more of the operations described in relation to the module.

In at least one embodiment, the node 708 includes a database module. The database module, which may also be referred to as a database program, database engine, or other similar nomenclature, comprises instructions to perform operations that may include, but are not limited to, parsing database commands and queries, generating query execution plans, distributing components of a query plan to other nodes, combining results of the performance of these components, and so forth. The database module 720 may further comprise instructions to scan and join tables, filter results, add data, insert data, delete data, and so on. In cases and embodiments, the capabilities of the database module may be restricted (for example by omitting or disabling relevant portions of database program code), depending on a role performed by the node 706.

As described in relation to FIG. 1, a node 708 may serve as a default or primary node, a router node, or a shard node. Note that although these may be described herein as performing distinct roles, embodiments of a node 706 may perform more than one role. For example, with respect to FIG. 1, any of the depicted nodes might serve as each of a default node, router node, or shard node. However, embodiments of a distributed database will always comprise more than one node.

In at least one embodiment, node 706 includes a router module 722. The router module 722 comprises instructions that, when performed by processors 728, causes the node 706 to perform one or more steps and operations described herein in relation to router nodes, such as steps described as being performed by a router node in relation to FIGS. 1-6.

In at least one embodiment, node 706 includes a default node module 724. The default node module 724 comprises instructions that, when performed by processors 728, causes the node 706 to perform one or more steps and operations described herein in relation to default nodes, such as steps described as being performed by a default node in relation to FIGS. 1-6.

In at least one embodiment, node 706 includes a shard module 725. The shard module 725 comprises instructions that, when performed by processors 728, cause the node 706 to perform one or more steps and operations described herein in relation to shard nodes, such as steps described as being performed by a shard node in relation to FIGS. 1-6.

As one skilled in the art will appreciate in light of this disclosure, certain embodiments may be capable of achieving certain advantages, including some or all of the following. In at least one embodiment, query processing on a computer is improved by reducing latency and network traffic, and to thereby cause computing devices external to the distributed database system to operate more efficiently. For example, a client computing device may interact with the distributed computing system to perform queries comprising instructions to generate a unique value from a sequence, and process those queries more quickly than could be done others. This may be the result of both being able to use a distributed database in scenarios where this was not possible before, due to a lack of sequence generation capability, or the more efficient provision of such capabilities.

Figure 8:
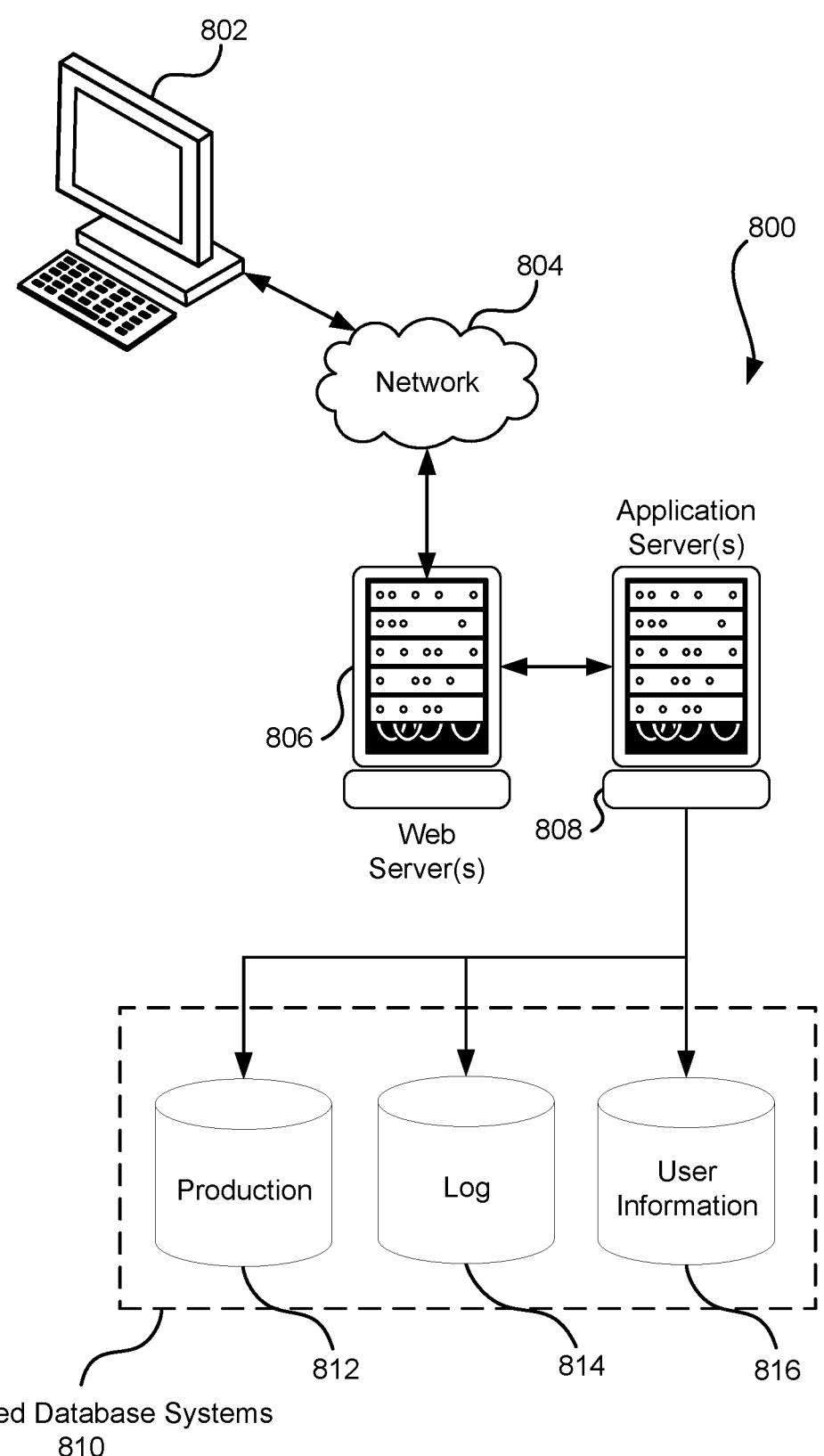
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a distributed database system 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The distributed database system 810 may correspond, in an embodiment, to the distributed database systems described in relation to FIGS. 1-7, such as the distributed database system 100 described in relation to FIG. 1. The distributed database system 810, in an embodiment, maintains several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the distributed database system 810.

The distributed database system 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

Embodiments described herein may be further understood in relation to the following clauses:

1. A computer-implemented method, comprising:
   receiving a request to provide a sequence of unique values usable by one or more nodes of a distributed database to process one or more database queries;
   storing an indication of a first range of the sequence of unique values on a first node of the distributed database;
   causing the first node of the distributed database to provide, in response to at least one of the one or more database queries, a value generated to be within the first range of the sequence of unique values; and
   causing the distributed database to process the at least one of the one or more database queries using the value within the first range.

2. The computer-implemented method of clause 1, wherein an indication of minimum and maximum values of the sequence of unique values, and an indication of one or more unassigned ranges of the sequence of unique values, are stored on a designated default node of the distributed database.

3. The computer-implemented method of clauses 1 or 2, further comprising:
   assigning the first node an additional range of the sequence of unique values in response to determining that the first node has exhausted unique values within the first range.

4. The computer-implemented method of any of clauses 1-3, further comprising:
   generating the value within the first range in response to one or more expressions in the database query that are indicative of generating a value in the sequence; and modifying the database query to include the generated value.

5. The computer-implemented method of any of clauses 1-4, wherein the sequence of unique values is divided into a plurality of ranges comprising the first range and a second range, and wherein a second node of the plurality of nodes is to provide, in response to at least one of the one or more database queries, one or more sequence numbers within the second range.

6. A system, comprising:
   one or more processors;
   one or more memories that store computer-executable instructions that, when executed by the one or more processors, cause the system to at least:
   receive a request to provide a sequence of unique values to one or more nodes of a distributed database;
   store an indication of a first range of the sequence of unique numbers on a first node of the distributed database;
   provide, by the first node of the distributed database and in response to a query, a value within the first range; and
   cause the distributed database to process the query using the value within the first range.

7. The system of clause 6, wherein the one or more memories store computer-executable instructions that, when executed by the one or more processors, cause the system to at least:

cause an indication of minimum and maximum values of the sequence of unique values to be stored on another node of the distributed database; and
   cause an indication of one or more unassigned ranges of the sequence of unique values to be stored on the another node.

8. The system of clauses 6 or 7, wherein the first node is assigned an additional range of the sequence of unique value based, at least in part, on use of available numbers in the first range being above a threshold amount.

9. The system of any of clauses 6-8, wherein the one or more memories store computer-executable instructions that, when executed by the one or more processors, cause the system to at least:
   generate the value within the first range in response to identifying an expression in the database query that is indicative of generating a value in the sequence; and
   modify the database query to include the generated value.

10. The system of any of clauses 5-9, wherein the sequence of unique values is divided into a plurality of ranges comprising the first range and a second range, and wherein a second node of the distributed database is to provide, in response to the query, one or more values within the second range.

11. The system of any of clauses 5-10, wherein the first node routes one or more portions of the query to one or more other nodes of the distributed database.

12. The system of any of clauses 5-11, wherein a node of the distributed database is assigned a range of the sequence of unique numbers upon being added to the distributed database.

13. The system of any of clauses 5-12, wherein the one or more memories store computer-executable instructions that, when executed by the one or more processors, cause the system to at least:
   generate the value without using information obtained from a computing device external to the first node.

14. A non-transitory computer-readable storage medium storing thereon executable instructions that, as a result of being executed by one or more processors of a computer system, cause the computer system to at least:
   receive a request to provide a sequence of unique values;
   cause an indication of a first range of the sequence of unique values to be stored on a first node of the distributed database;
   cause the first node of the distributed database to provide, in response to a query, one or more values within the first range; and
   cause the distributed database to process the query using the one or more values within the first range.

15. The non-transitory computer-readable storage medium of clause 14, comprising further comprise instructions that, as a result of being executed by the one or more processors, cause the computer system to at least:
   cause an indication of minimum and maximum values of the sequence of unique values to be stored on a second node of the distributed database; and
   cause an indication of one or more unassigned ranges of the sequence of unique values to be stored on the second node of the distributed database.

16. The non-transitory computer-readable storage medium of clauses 14 or 15, wherein the first node is assigned an additional range of the sequence of unique numbers based, at least in part, on using all available numbers in the first range.

17. The non-transitory computer-readable storage medium of any of clauses 14-16, comprising further comprise instructions that, as a result of being executed by the one or more processors, cause the computer system to at least:

generate the one or more values within the first range based, at least in part, on one or more expressions in the query that are indicative of generating a value in the sequence; and modify the database query to include the one or more generated values within the first range.

18. The non-transitory computer-readable storage medium of any of clauses 14-17, wherein the sequence of unique values is divided into a plurality of ranges comprising the first range and a second range, and wherein a second node of distributed database is to provide, in response to query, one or more values within the second range.

19. The non-transitory computer-readable storage medium of any of clauses 14-18, wherein the first node routes one or more portions of the query to one or more other nodes of the distributed database.

20. The non-transitory computer-readable storage medium of any of clauses 14-19, wherein a node of the distributed database is assigned a range of the sequence of unique values upon being added to the distributed database.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
receiving a request to provide a sequence of unique values usable by one or more nodes of a distributed database to process one or more database queries;
storing an indication of a first range of the sequence of unique values on a first node of the distributed database;
causing the first node of the distributed database to provide, in response to one or more expressions in one of the one or more database queries, a value generated to be within the first range of the sequence of unique values, the one or more expressions indicative of generating a value in the sequence; and
causing the distributed database to process the at least one of the one or more database queries using the value within the first range.

2. The computer-implemented method of claim 1, wherein an indication of minimum and maximum values of the sequence of unique values, and an indication of one or more unassigned ranges of the sequence of unique values, are stored on a designated default node of the distributed database.

3. The computer-implemented method of claim 1, further comprising:
assigning the first node an additional range of the sequence of unique values in response to determining that the first node has exhausted unique values within the first range.

4. The computer-implemented method of claim 1, further comprising
modifying the one or more database queries to include the generated value.

5. The computer-implemented method of claim 1, wherein the sequence of unique values is divided into a plurality of ranges comprising the first range and a second range, and wherein a second node of the distributed database is to provide, in response to at least one of the one or more database queries, one or more sequence numbers within the second range.

6. A system, comprising:
one or more processors;
one or more memories that store computer-executable instructions that, when executed by the one or more processors, cause the system to at least:
receive a request to provide a sequence of unique values to one or more nodes of a distributed database;
store an indication of a first range of the sequence of unique numbers on a first node of the distributed database;
provide, by the first node of the distributed database and in response to one or more expressions in a query, a value within the first range, the one or more expressions indicative of a value in the first range to be generated based on the query; and
cause the distributed database to process the query using the value within the first range.

7. The system of claim 6, wherein the one or more memories store computer-executable instructions that, when executed by the one or more processors, cause the system to at least:
cause an indication of minimum and maximum values of the sequence of unique values to be stored on another node of the distributed database; and
cause an indication of one or more unassigned ranges of the sequence of unique values to be stored on the another node.

8. The system of claim 6, wherein the first node is assigned an additional range of the sequence of unique values based, at least in part, on use of available numbers in the first range being above a threshold amount.

9. The system of claim 6, wherein the one or more memories store computer-executable instructions that, when executed by the one or more processors, cause the system to at least
modify the distributed database query to include the generated value.

10. The system of claim 6, wherein the sequence of unique values is divided into a plurality of ranges comprising the first range and a second range, and wherein a second node of the distributed database is to provide, in response to the query, one or more values within the second range.

11. The system of claim 6, wherein the first node routes one or more portions of the query to one or more other nodes of the distributed database.

12. The system of claim 6, wherein a node of the distributed database is assigned a range of the sequence of unique numbers upon being added to the distributed database.

13. The system of claim 6, wherein the one or more memories store computer-executable instructions that, when executed by the one or more processors, cause the system to at least:

generate the value without using information obtained from a computing device external to the first node.

14. A non-transitory computer-readable storage medium storing thereon executable instructions that, as a result of being executed by one or more processors of a computer system, cause the computer system to at least:

receive a request to provide a sequence of unique values;

cause an indication of a first range of the sequence of unique values to be stored on a first node of a distributed database;

cause the first node of the distributed database to provide, and in response to one or more expressions in a query, one or more values within the first range, the one or more expressions indicative of generating a value in the first range; and cause the distributed database to process the query using the one or more values within the first range.

15. The non-transitory computer-readable storage medium of claim 14, comprising further instructions that, as a result of being executed by the one or more processors, cause the computer system to at least:

cause an indication of minimum and maximum values of the sequence of unique values to be stored on a second node of the distributed database; and cause an indication of one or more unassigned ranges of the sequence of unique values to be stored on the second node of the distributed database.

16. The non-transitory computer-readable storage medium of claim 14, wherein the first node is assigned an additional range of the sequence of unique numbers based, at least in part, on using all available numbers in the first range.

17. The non-transitory computer-readable storage medium of claim 14, comprising further comprise instructions that, as a result of being executed by the one or more processors, cause the computer system to at least modify the distributed database query to include the one or more generated values within the first range.

18. The non-transitory computer-readable storage medium of claim 14, wherein the sequence of unique values is divided into a plurality of ranges comprising the first range and a second range, and wherein a second node of distributed database is to provide, in response to query, one or more values within the second range.

19. The non-transitory computer-readable storage medium of claim 14, wherein values in the sequence of unique values are made to be unique based, at least in part, on monotonically increasing values generated within the sequence of unique values.

20. The non-transitory computer-readable storage medium of claim 14, wherein a node of the distributed database is assigned a range of the sequence of unique values upon being added to the distributed database.

* * * * *